Patented Sept. 3, 1946

2,407,107

UNITED STATES PATENT OFFICE 2,407,107

PREPARATION OF STABLE DISPERSIONS OF ALKYL ALKACRYLATE POLYMERS

Joseph Edward Smith, Wilmington, Del., assignor to E. I. du Pont de Nemours & Company, Wilmington, Del., a corporation of Delaware No Drawing. Application May 5, 1943, Serial No. 485,757

12 Claims. (Cl. 260—32)

This invention relates to a process for preparing stable aqueous dispersions of alkyl alkacrylate polymers.

In U. S. Patent 2,318,429 (issued May 4, 1943) and U. S. Patents 2,343,089 and 2,343,090 (issued February 29, 1944), there has been described a process for preparing highly stable dispersions of alkyl alkacrylate polymers particularly suitable for the treatment of textile fibers, wherein the preferred emulsifying and dispersing agent is a water soluble partially saponified polyvinyl acetate, or, what may be termed in other words, a water soluble derivative of polyvinyl alcohol containing free hydroxyl groups. In U. S. Patent 2,318,429, it is pointed out that the partially saponified polyvinyl acetate used in the preparation of stable dispersions of the alkyl alkacrylates is preferably of the type having a saponification number in the range of from 40 to 130, and a viscosity in a 4% aqueous solution at 20° C. of from 20 to 25 C. P. In U. S. Patents 2,343,089 and 2,343,090, a method is disclosed for preparing textile treating compositions comprising an alkyl alkacrylate or other vinyl compound, held in stable dispersion by the water soluble partially saponified polyvinyl acetate, which have a substantive affinity for fibers and which can be applied thereto by a process of exhaustion from dilute treating baths. In U. S. application Serial No. 471,577, a process is disclosed whereby the partially saponified polyvinyl acetate may be produced in a uniformly high degree of purity, particularly suitable for the preparation of stable aqueous dispersions of the alkyl alkacrylate polymers.

It is generally recognized that, in the preparation of stable fluid aqueous emulsions and dispersions, the average particle size of the dispersed phase should be below 3 to 5 microns. The average particle size in technical dispersions which are offered for use in the textile trade is usually in the range of from 0.1 to 5 microns. Experience shows that a dispersion which has satisfactory stability to long storage has an average particle size no greater than 2 to 5 microns. It is of course understood that the great majority of particles will fall within the range given for the average particle size, although there may be a relatively small percentage of larger particles.

While in small scale operation, such as in laboratory apparatus or small scale semi-works equipment, the necessary particle size and uniformity of the emulsified alkyl alkacrylate monomer in the aqueous media can be obtained with simple equipment and in a relatively short time so that on polymerization of the alkyl alkacrylate monomer in the emulsion the polymer is obtained in the necessary degree of fineness so that it remains as a stable aqueous dispersion, it has been found that in large scale commercial production it is difficult to obtain the required uniformity and fineness of particle size in simple equipment and within a reasonable length of time. Ordinarily the emulsions are prepared by the use of high speed agitators, homogenizers, or by the use of both, so that the alkyl alkacrylate monomer is dispersed in the aqueous phase in as high a state of sub-division of the liquid particles as possible. In the large scale commercial production, the particle size of the product has been found to vary widely from batch to batch, with sedimentation occurring in those batches that have not been properly emulsified. It has been found that the average maximum particle size permissible in the preparation of these highly stable alkyl alkacrylate aqueous dispersions is from 2 to 5 microns, and that the presence of a comparatively large number of particles with a diameter greater than 10 microns is apt to produce sedimentation as a result of the agglomeration of these larger particles. It has also been found that the presence of a comparatively large number of particles of greater diameter than 10 microns frequently leads to difficulties in the application of the dispersions to textiles by either the padding operation or by the process of exhaustion from dilute baths, for such dispersions tend to break and deposit unevenly on the goods, resulting in spotty effects.

While these difficulties can be overcome by the exercise of due care in the preparation of the emulsion to assure complete and satisfactory emulsification of the monomer prior to polymerization, it requires a prolonged period of time in the milling operations so that the output from any particular homogenizing mill is limited.

It is therefore an object of this invention to provide a process for preparing stable aqueous dispersions of alkyl alkacrylate polymers by the emulsion polymerization process, wherein the alkyl alkacrylate monomer is emulsified in an aqueous solution in a much shorter time than has heretofore been required, and with a greater degree of uniformity when the emulsification is carried out in large scale commercial production. It is a further object of the invention to provide a process for emulsifying alkyl alkacrylate monomers in aqueous solution with a water soluble partially saponified polyvinyl acetate as the emulsifying agent, and in the presence of a small amount of a petroleum hydrocarbon such as mineral oil and waxes, and in the presence of a polymerization catalyst such as benzoyl peroxide or other commonly employed catalyst. A further object of the invention is to produce stable aqueous dispersions of alkyl alkacrylate polymers having an average particle size of not more than 5 microns, which contain a partially saponified polyvinyl acetate as the dispersing agent and a refined petroleum hydrocarbon as a stabilizer.

I have found that new and stable aqueous dispersions of alkyl alkacrylate polymers can be prepared by emulsifying the alkyl alkacrylate monomer in an aqueous solution of a partially saponified polyvinyl acetate in the presence of from 0.25% to 10% (based on the weight of the alkyl alkacrylate) of a refined petroleum hydrocarbon having a boiling point above approximately 110° C., and carrying out the polymerization of the emulsified monomer under the conditions normally employed in the emulsion polymerization processes of the prior art. The emulsification may be carried out in the presence of additional dispersing agents of the types more particularly disclosed in my co-pending applications above-mentioned, and in the presence of cationic surface active agents or of water soluble metal salts of polyvalent metals such as aluminum, barium, zinc, etc., which are used to impart substantive affinity for textile fibers to the resulting dispersed polymer. The petroleum hydrocarbon is preferably employed in an amount equal to from 0.5% to 5%, based on the weight of the alkyl alkacrylate monomer. The amount of polyvinyl alcohol (water soluble partially saponified polyvinyl ester) that should be employed to maintain a stable aqueous dispersion of the alkyl alkacrylate polymers should be above 6%, based on the weight of the polymer. The top limit is determined only by the viscosity desired for the resulting aqueous suspension. Where too large an amount is employed, the suspension will become too viscous to permit proper control during the polymerization process. Highly stable dispersions containing from 10% to 40% of the alkyl alkacrylate, based on the total weight of the aqueous dispersion, may be prepared by this process.

While the petroleum hydrocarbon is employed in the emulsification process as an emulsification assistant to decrease the time and energy required in preparing the emulsion, the resulting dispersion after polymerization also is a highly stable dispersion and has a high degree of stability which makes it possible to store the product in warehouses for long periods of time for commercial distribution, and it is therefore considered to act as a suspension stabilizer.

Generally, experience has indicated, wherever comparison can be made, that, where less energy is required to form an emulsion, such emulsion or resulting dispersion has higher stability than where more energy is required to effect reduction to the same particle size.

The following examples are given to illustrate the invention. The parts used are by weight.

*Example I*

Twenty-five parts of n-butyl methacrylate monomer containing 0.25 part of benzoyl peroxide were mixed with 75 parts of an aqueous solution containing 2.5 parts of partially saponified polyvinyl acetate and 0.25 part of stearyl trimethyl ammonium bromide at 25° to 30° C. The partially saponified polyvinyl acetate employed had a viscosity in a 4% aqueous solution of 20 C. P. at 20° C. and had a saponification number of about 110. The mixture was agitated for 30 minutes with two propeller type agitators, known to the trade as "Lightnin" agitators, to obtain a coarse emulsion. The emulsion was homogenized by four passes through a disc type homogenizing pump, known to the trade as a Wesco pump, and then heated without agitation for 16 hours at 70° C. The monomer was completely polymerized at the end of this period.

A similar preparation was carried out, using 1.25 parts of crude scale wax having a melting point of about 50° C. as an addition to the 25 parts of n-butyl methacrylate. The particle size range of the two emulsions at corresponding stages of the operation was as follows:

| Stage of operation | Particle size in microns of emulsion containing | |
| --- | --- | --- |
| | No crude scale wax | Crude scale wax |
| 30 minutes mixing with "Lightnin" agitator | 2–60 | 3–4 |
| One pass through homogenizing pump | 2–30 | 1–2 |
| Two passes through homogenizing pump | 1–30 | 1–2 |
| Three passes through homogenizing pump | 1–20 | 1–2 |
| Four passes through homogenizing pump | 1–20 | 1–2 |
| Polymerized dispersion | 2–14 | 1–2 |

The product containing the crude scale wax has a much smaller and more uniform particle size than the product that does not contain the wax, and it is easier to manufacture, requiring less time and energy. The polymerized dispersion containing wax was stable without sedimentation on storage for a number of months, while the sample without wax sedimented badly within a week's time.

In the following examples, the agitation and homogenization employed has been adopted on the basis of experience as being reasonably equivalent to the larger scale agitation and homogenization described in Example I. The technique used in the following examples is not intended to represent the maximum efficiency which can be obtained in a small scale operation, but has been adopted to demonstrate the effectiveness of the petroleum hydrocarbons as emulsifying assistants.

*Example II*

Twenty-five parts of n-butylmethacrylate monomer, containing 0.25 part of benzoyl peroxide and various amounts of a refined white mineral oil with a viscosity of about 40 S. U. V.$_{100}$ from a Pennsylvania crude as indicated in the table, were mixed in each case, with 2.5 parts of partially saponified polyvinyl acetate in water to make a total of 100 parts. The partially saponified polyvinyl acetate had a saponification number of 110 and produced a viscosity of about 20 C. P. in a 4% aqueous solution at 20° C. The monomer solution was added to the aqueous solution at 25° C., while mixing with a Hamilton Beach soda mixer, and agitation continued for 3 minutes. The emulsion obtained was homogenized by four passes through a Travis disper mill with the valve on the drain left open. The emulsion was aged (polymerized) for 16 hours at 70° C. to obtain a polymer dispersion. The particle size of the dispersed particles after polymerization was determined microscopically, and found to be as given in the following table:

| Number | n-Butyl methacrylate monomer | 40 S. U. V.$_{100}$ white mineral oil | Average particle size aged dispersion in microns |
| --- | --- | --- | --- |
| | Percent | Percent | |
| 1 | 25 | ---- | 4.0–10 |
| 2 | 25 | 0.06 | 0.5–8 |
| 3 | 25 | 0.13 | 0.5–4 |
| 4 | 25 | 0.19 | 0.5–4 |
| 5 | 25 | 0.6 | 2.0–3 |
| 6 | 25 | 3.3 | 0.5–4 |

These data show that as little as 0.06% of the white mineral oil in the composition or 0.25% on the weight of the n-butylmethacrylate monomer acts to improve appreciably the particle size reduction while the use of 0.5% of the white mineral oil on the weight of the monomer has a marked effect in improving the efficiency of particle size reduction where partially saponified polyvinyl acetate is used as the dispersing agent.

*Example III*

Example II was repeated, using in each run a mixture of 0.25 part of stearyl trimethyl ammonium bromide and 2.5 parts of the partially saponified polyvinyl acetate as emulsifying and dispersing agents. The results obtained are summarized in the following table:

| Number | n-Butyl methacrylate monomer | 40 S. U. V.$_{100}$ white mineral oil | Average particle size in microns |
|---|---|---|---|
|  | Percent | Percent |  |
| 7 | 25 | ---- | 1.0–10 |
| 8 | 25 | 0.06 | 0.5–2 |
| 9 | 25 | 0.13 | 0.5–1 |
| 10 | 25 | 0.19 | 0.5–1 |
| 11 | 25 | 0.25 | 1.0–2 |
| 12 | 25 | 1.25 | 1.0–2 |

This table shows that as little as 0.25% of the white mineral oil on the weight of the n-butyl methacrylate produces a noticeable improvement, while the use of 0.5% white mineral oil on the weight of the n-butyl methacrylate produces a marked improvement in the efficiency of particle size reduction where partially saponified polyvinyl acetate, together with a representative cationic agent, are used as dispersing and emulsifying agents.

*Example IV*

Experiments were run as in samples 11 and 12 of Example III, using in each run a mixture of 0.25 part of stearyl trimethyl ammonium bromide and 2.5 parts of the partially saponified polyvinyl acetate as the emulsifying and dispersing agents, and substituting two different blended mineral oils with a viscosity of about 100 S. U. V.$_{100}$, petrolatum, and crude scale wax (M. P. 50° C.) for the 40 S. U. V.$_{100}$ white mineral oil. The data obtained are summarized in the following table:

| No. | n-Butyl methacrylate monomer | White mineral oil | Oil A[1] | Oil B[2] | Petrolatum | Crude scale wax | Average particle size in microns |
|---|---|---|---|---|---|---|---|
|  | Per cent | Per cent | Per cent | Per cent | Per cent | Per cent |  |
| 6 | 25 | ---- | ---- | ---- | ---- | ---- | 1.0–10 |
| 11 | 25 | 0.25 | ---- | ---- | ---- | ---- | 1.0–2 |
| 12 | 25 | 1.25 | ---- | ---- | ---- | ---- | 1.0–2 |
| 13 | 25 | ---- | 0.25 | ---- | ---- | ---- | 1.0–1.5 |
| 14 | 25 | ---- | 1.25 | ---- | ---- | ---- | 1.0–2 |
| 15 | 25 | ---- | ---- | 0.25 | ---- | ---- | 0.2–0.8 |
| 16 | 25 | ---- | ---- | 1.25 | ---- | ---- | 0.2–0.8 |
| 17 | 25 | ---- | ---- | ---- | 0.25 | ---- | 0.2–0.8 |
| 18 | 25 | ---- | ---- | ---- | 1.25 | ---- | 0.5–1.0 |
| 19 | 25 | ---- | ---- | ---- | ---- | 0.25 | 1.0–2.0 |
| 20 | 25 | ---- | ---- | ---- | ---- | 1.25 | 0.5–1.0 |

[1] Blended mineral oil A was obtained from the Atlantic Refining Co. under the code 1225 mineral oil.
[2] Blended mineral oil B was obtained from the Atlantic Refining Co. under the code 1268 textile oil.

The 40 S. U. V.$_{100}$ white mineral oil and crude paraffin wax are preponderantly paraffinic hydrocarbons; the blended oils are mixtures of paraffinic and cycloaliphatic hydrocarbons; the petrolatum is composed largely of cycloaliphatic hydrocarbons. These data show that a wide variety of petroleum hydrocarbons act in essentially the same manner in markedly improving the ease of particle size reduction when emulsifying n-butyl methacrylate monomer with a partially saponified polyvinyl acetate and a representative cationic surface active agent as dispersing and emulsifying agents.

*Example V*

Twenty-five parts of n-butyl methacrylate monomer containing either 0.6 part of a 40 S. U. V.$_{100}$ white mineral oil or a blended mineral oil of about 100 S. U. V.$_{100}$ were emulsified as in Example II with an aqueous solution containing 2.5 parts of the partially saponified polyvinyl acetate, and in addition, 1.1 parts of basic aluminum formate. The emulsions were aged and examined as in Example II. The data obtained were as follows:

| No. | n-Butyl methacrylate monomer | White mineral oil | Blended mineral oil A | Aluminum formate | Particle size in microns |
|---|---|---|---|---|---|
|  | Per cent | Per cent | Per cent | Per cent |  |
| 22 | 25 | ---- | ---- | 1.1 | 4–10 |
| 22 | 25 | 0.6 | ---- | 1.1 | 2–3 |
| 23 | 25 | ---- | 0.6 | 1.1 | 2–3 |

The data show that the mineral oils produce a marked improvement in the particle size reduction of n-butyl methacrylate when partially saponified polyvinyl acetate is used as the dispersing agent in the presence of an aluminum salt, such as aluminum formate.

*Example VI*

Twenty-five parts of isobutyl methacrylate monomer containing 0.25 part of benzoyl peroxide alone or with 0.6 part of a blended mineral oil of about 100 S. U. V.$_{100}$, as indicated in the following table, were emulsified by mixing with an aqueous solution containing 2.5 parts of the partially saponified polyvinyl acetate, as employed in the above examples, and additions of basic aluminum formate and stearyl trimethyl ammonium bromide, as indicated in the attached table, to make a total of 100 parts, including all ingredients. The emulsification and polymerization to obtain dispersions of the polymer were carried out as in Example II. The results were as follows:

| No. | Isobutyl methacrylate monomer | Blended mineral oil A | Stearyl trimethyl ammonium bromide | Basic aluminum formate | Particle size in microns |
|---|---|---|---|---|---|
| | Per cent | Per cent | Per cent | Per cent | |
| 24 | 25 | | | | 4.0-8 |
| 25 | 25 | 0.6 | | | 2.0-3 |
| 26 | 25 | | | 1.1 | 4.0-8 |
| 27 | 25 | 0.6 | | 1.1 | 2.0-3 |
| 28 | 25 | | 0.25 | | 2.0-3 |
| 29 | 25 | 0.6 | 0.25 | | 0.5-1 |

These comparisons show that the dispersions containing the relatively small amount of mineral oil all had a markedly smaller particle size than the corresponding dispersions without mineral oil.

Example VII

Methyl methacrylate monomer was substituted for the isobutyl methacrylate monomer and the 40 S. U. V.$_{100}$ white mineral oil from a Pennsylvania crude for the blended mineral oil in Example VI. The data obtained are summarized in the following table:

| No. | Methyl methacrylate monomer | White mineral oil | Stearyl trimethyl ammonium bromide | Basic aluminum formate | Particle size in microns |
|---|---|---|---|---|---|
| | Per cent | Per cent | Per cent | Per cent | |
| 30 | 25 | | | | 4.0-8 |
| 31 | 25 | 0.6 | | | 1.0-2 |
| 32 | 25 | | | 1.1 | 3.0-4 |
| 33 | 25 | 0.6 | | 1.1 | 1.0-2 |
| 34 | 25 | | 0.25 | | 1.0-2 |
| 35 | 25 | 0.6 | 0.25 | | 0.2-0.4 |
| 36 | 25 | | 0.25 | 1.1 | 1.0-3 |
| 37 | 25 | 0.6 | 0.25 | 1.1 | 0.1-0.4 |

The data clearly show that the dispersions containing the relatively small amount of 40 S. U. V.$_{100}$ white mineral oil all had markedly smaller particle sizes than did the corresponding dispersions without the mineral oil.

It is of course to be understood that other types of petroleum oils and petroleum hydrocarbon waxes, either of the paraffinic or cycloaliphatic types or mixtures of the same, may be substituted for those specifically disclosed in the above examples. As above pointed out, those refined petroleum hydrocarbons having a boiling point above 110° C. are preferred.

The invention also contemplates the preparation of stable emulsions and dispersions of alkyl alkacrylate interpolymers and copolymers. Plasticizers and other resins may be dissolved in the monomers before polymerization to give modified polymers, as more particularly described in U. S. P. 2,318,429 and 2,343,089 to 2,343,093, inclusive.

While the preferred dispersing and emulsifying agents are water soluble partially saponified polyvinyl acetates having a saponification number in the range of from 40 to 130, and having a viscosity in a 4% aqueous solution of from about 20 to 25 C. P. at 20° C., it will of course be obvious that other water soluble derivatives of polyvinyl alcohol, containing hydroxyl groups such as may be produced by partially saponifying other polyvinyl esters, may be substituted for those specifically described in the above examples.

I claim:

1. A process for preparing stable aqueous dispersions of polymerized alkyl alkacrylates containing from 10% to 40% of the dispersed alkacrylate, which comprises emulsifying the alkyl alkacrylate monomer and from 0.25% to 10.0%, based on the weight of the alkacrylate, of a refined petroleum hydrocarbon boiling about 110° C. in an aqueous solution of a partially saponified polyvinyl acetate having a saponification number of from 40 to 130 and a viscosity in a 4% aqueous solution at 20° C. of from 20 to 25 C. P., and effecting polymerization of the monomer, the partially saponified polyvinyl acetate being present in an amount equal to at least 6% of the weight of the dispersed alkacrylate.

2. A process for preparing stable aqueous dispersions of polymerized alkyl alkacrylates containing from 10% to 40% of the dispersed alkacrylate, which comprises emulsifying the alkyl alkacrylate monomer and from 0.25% to 10.0%, based on the weight of the alkacrylate, of a 40 S. U. V.$_{100}$ white mineral oil in an aqueous solution of a partially saponified polyvinyl acetate having a saponification number of from 40 to 130 and a viscosity in a 4% aqueous solution at 20° C. of from 20 to 25 C. P., and effecting polymerization, the partially saponified polyvinyl acetate being present in an amount equal to at least 6% of the weight of the dispersed alkacrylate.

3. A process for preparing stable aqueous dispersions of polymerized n-butyl methacrylate containing from 10% to 40% of the dispersed n-butyl methacrylate, which comprises emulsifying the n-butyl methacrylate monomer and from 0.25% to 10.0%, based on the weight of the methacrylate, of a refined petroleum hydrocarbon boiling above 110° C. in an aqueous solution of a partially saponified polyvinyl acetate having a saponification number of from 40 to 130 and a viscosity in a 4% aqueous solution at 20° C. of from 20 to 25 C. P., and effecting polymerization, the partially saponified polyvinyl acetate being present in an amount equal to at least 6% of the weight of the dispersed n-butyl methacrylate.

4. A process for preparing stable aqueous dispersions of polymerized n-butyl methacrylate containing from 10% to 40% of the dispersed n-butyl methacrylate, which comprises emulsifying the n-butyl methacrylate monomer and from 0.25% to 10%, based on the weight of the methacrylate, of a 40 S. U. V.$_{100}$ white mineral oil in an aqueous solution of a partially saponified polyvinyl acetate having a saponification number of from 40 to 130 and a viscosity in a 4% aqueous solution at 20° C. of from 20 to 25 C. P., and effecting polymerization, the partially saponified polyvinyl acetate being present in an amount equal to at least 6% of the weight of the dispersed n-butyl methacrylate.

5. A process for preparing stable aqueous dispersions of polymerized alkyl methacrylates containing from 10% to 40% of the dispersed alkyl methacrylate, which comprises emulsifying the alkyl methacrylate monomer and from 0.25% to 10.0%, based on the weight of the alkacrylate, of a refined petroleum hydrocarbon boiling above 110° C. in an aqueous solution of a partially saponified polyvinyl acetate having a saponification number of from 40 to 130 and a viscosity in a 4% aqueous solution at 20° C. of from 20 to 25 C. P., and effecting polymerization, the partially saponified polyvinyl acetate being present in an amount equal to at least 6% of the weight of the dispersed alkyl methacrylate.

6. A stable aqueous dispersion of a polymerized alkyl alkacrylate containing from 10% to 40% of the dispersed alkacrylate which has been produced by the emulsion polymerization of the alkyl alkacrylate monomer dispersed in an aqueous solution of a water soluble partially saponified polyvinyl acetate having a saponification number of from 40 to 130 and a viscosity in a 4% aqueous solution at 20° C. of from 20 to 25 C. P. and in the presence of from 0.25% to 10.0%, based on the weight of the alkacrylate, of a refined petroleum hydrocarbon boiling above 110° C., the partially saponified polyvinyl acetate being present in an amount equal to at least 6% of the weight of the dispersed alkacrylate.

7. A stable aqueous dispersion of a polymerized alkyl alkacrylate containing from 10% to 40% of the dispersed alkacrylate which has been produced by the emulsion polymerization of the alkyl alkacrylate monomer dispersed in an aqueous solution of a water soluble partially saponified polyvinyl acetate having a saponification number of from 40 to 130 and a viscosity in a 4% aqueous solution at 20° C. of from 20 to 25 C. P. and in the presence of from 0.25% to 10.0%, based on the weight of the alkacrylate, of a 40 S. U. V.$_{100}$ white mineral oil, the partially saponified polyvinyl acetate being present in an amount equal to at least 6% of the weight of the dispersed alkacrylate.

8. A stable aqueous dispersion of a polymerized n-butyl-methacrylate containing from 10% to 40% of the dispersed n-butyl methacrylate which has been produced by the emulsion polymerization of the n-butyl methacrylate monomer dispersed in an aqueous solution of a water soluble partially saponified polyvinyl acetate having a saponification number of from 40 to 130 and a viscosity in a 4% aqueous solution at 20° C. of from 20 to 25 C. P. and in the presence of from 0.25% to 10.0%, based on the weight of the methacrylate, of a 40 S. U. V.$_{100}$ white mineral oil, the partially saponified polyvinyl acetate being present in an amount equal to at least 6% of the weight of the dispersed n-butyl methacrylate.

9. A stable aqueous dispersion of a polymerized alkyl methacrylate containing from 10% to 40% of the dispersed alkyl methacrylate which has been produced by the emulsion polymerization of the alkyl methacrylate monomer dispersed in an aqueous solution of a water soluble partially saponified polyvinyl acetate having a saponification number of from 40 to 130 and a viscosity in a 4% aqueous solution at 20° C. of from 20 to 25 C. P., and in the presence of from 0.25% to 10.0%, based on the weight of the alkacrylate, of a defined petroleum hydrocarbon boiling above 110° C., the partially saponified polyvinyl acetate being present in an amount equal to at least 6% of the weight of the dispersed alkyl methacrylate.

10. A stable aqueous dispersion of a polymerized n-butyl-methacrylate containing from 10% to 40% of the dispersed n-butyl methacrylate which has been produced by the emulsion polymerization of the n-butyl methacrylate monomer dispersed in an aqueous solution of a water soluble partially saponified polyvinyl acetate having a saponification number of from 40 to 130 and a viscosity in a 4% aqueous solution at 20° C. of from 20 to 25 C. P., and in the presence of from 0.25% to 10.0%, based on the weight of the methacrylate, of a refined petroleum hydrocarbon boiling above 110° C., the partially saponified polyvinyl acetate being present in an amount equal to at least 6% of the weight of the dispersed n-butyl methacrylate.

11. A stable aqueous dispersion of a polymerized methyl methacrylate containing from 10% to 40% of the dispersed methyl methacrylate which has been produced by the emulsion polymerization of the methyl methacrylate monomer dispersed in an aqueous solution of a water soluble partially saponified polyvinyl acetate having a saponification number of from 40 to 130 and a viscosity in a 4% aqueous solution at 20° C. of from 20 to 25 C. P., and in the presence of from 0.25% to 10.0%, based on the weight of the methacrylate, of a refined petroleum hydrocarbon boiling above 110° C., the partially saponified polyvinyl acetate being present in an amount equal to at least 6% of the weight of the dispersed methylmethacrylate.

12. A stable aqueous dispersion of a polymerized isobutyl methacrylate containing from 10% to 40% of the dispersed isobutylmethacrylate which has been produced by the emulsion polymerization of the isobutyl methacrylate monomer dispersed in an aqueous solution of a water soluble partially saponified polyvinyl acetate having a saponification number of from 40 to 130 and a viscosity in a 4% aqueous solution at 20° C. of from 20 to 25 C. P., and in the presence of from 0.25 to 10.0%, based on the weight of the methacrylate, of a refined petroleum hydrocarbon boiling above 110° C., the partially saponified polyvinyl acetate being present in an amount equal to at least 6% of the weight of the dispersed isobutylmethacrylate.

JOSEPH EDWARD SMITH.